(12) United States Patent
Yang et al.

(10) Patent No.: US 11,108,682 B2
(45) Date of Patent: Aug. 31, 2021

(54) ESTABLISHING ENTRY CORRESPONDING TO EQUAL-COST PATHS

(71) Applicant: NEW H3C TECHNOLOGIES CO., LTD., Hangzhou (CN)

(72) Inventors: Sansheng Yang, Beijing (CN); Yingyun Bai, Beijing (CN); Jia Li, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 140 days.

(21) Appl. No.: 16/481,066

(22) PCT Filed: Jan. 25, 2018

(86) PCT No.: PCT/CN2018/074118
§ 371 (c)(1),
(2) Date: Jul. 25, 2019

(87) PCT Pub. No.: WO2018/137682
PCT Pub. Date: Aug. 2, 2018

(65) Prior Publication Data
US 2019/0394119 A1 Dec. 26, 2019

(30) Foreign Application Priority Data
Jan. 25, 2017 (CN) .......................... 201710056621.5

(51) Int. Cl.
*H04L 12/707* (2013.01)
*H04L 12/723* (2013.01)
(Continued)

(52) U.S. Cl.
CPC ............ *H04L 45/24* (2013.01); *H04L 45/507* (2013.01); *H04L 45/745* (2013.01); *H04L 47/125* (2013.01)

(58) Field of Classification Search
CPC ......... H04L 45/16; H04L 45/18; H04L 45/20; H04L 45/22; H04L 45/24; H04L 49/3009; H04L 45/74–78
See application file for complete search history.

(56) References Cited

U.S. PATENT DOCUMENTS 9,374,311 B1 6/2016 Zhou et al.
2008/0025309 A1 1/2008 Swallow
(Continued)

FOREIGN PATENT DOCUMENTS

CN 101094185 A 12/2007
CN 101572667 A 11/2009
(Continued)

OTHER PUBLICATIONS

ISA State Intellectual Property Office of the People's Republic of China, Written Opinion of the International Searching Authority Issued in Application No. PCT/CN2018/074118, dated May 7, 2018, WIPO, 3 pages.
(Continued)

*Primary Examiner* — Marcus Smith
(74) *Attorney, Agent, or Firm* — McCoy Russell LLP (57) ABSTRACT

Methods of establishing an entry corresponding to equal-cost paths, network devices and non-transitory machine-readable storage mediums are provided. In one aspect, a network device assigns an inner label and an outer label for each of N paths configured to be equal cost with each other between the network device and a destination network device, wherein the respective inner labels corresponding to the paths are same with each other; createestablishes a FIB entry, wherein the FIB entry includes an address of the destination network device, the number of ECMP entries in an ECMP table corresponding to the paths, and the same inner label, and the number of ECMP entries in the ECMP table is equal to a preset fixed value; and assigns at least one
(Continued)

ECMP entry for each of the paths based on the number N of the paths and the fixed value.

13 Claims, 3 Drawing Sheets

(51) Int. Cl.
*H04L 12/741* (2013.01)
*H04L 12/803* (2013.01)

(56) References Cited

U.S. PATENT DOCUMENTS

| | | | |
|---|---|---|---|
| 2012/0327938 | A1 | 12/2012 | Song |
| 2013/0083660 | A1 | 4/2013 | Rajagopalan et al. |
| 2016/0112299 | A1* | 4/2016 | Li .................... H04L 47/17 370/255 |
| 2016/0254988 | A1* | 9/2016 | Eckert ............... H04L 12/4633 370/390 |
| 2016/0352620 | A1* | 12/2016 | Schmutzer ............ H04L 49/90 |
| 2019/0245779 | A1* | 8/2019 | Jonnalagadda ..... H04L 12/4641 |

FOREIGN PATENT DOCUMENTS

| | | | |
|---|---|---|---|
| CN | 102857414 | A | 1/2013 |
| CN | 103078804 | A | 5/2013 |
| CN | 104144120 | A | 11/2014 |
| JP | 2012532528 | A | 12/2012 |
| WO | 2014180307 | A1 | 11/2014 |
| WO | 2016086713 | A1 | 6/2016 |

OTHER PUBLICATIONS

European Patent Office, Extended European Search Report Issued in Application No. 18745079.6, dated Oct. 28, 2019, Germany, 6 pages.

State Intellectual Property Office of the People's Republic of China, Office Action and Search Report Issued in Application No. 201710056621.5, dated Nov. 28, 2019, 14 pages. (Submitted with Partial Translation).

ISA State Intellectual Property Office of the People's Republic of China, International Search Report Issued in Application No. PCT/CN2018/074118, dated May 7, 2018, WIPO, 4 pages.

ISA State Intellectual Property Office of the People's Republic of China, International Search Report Issued in Application No. PCT/CN2018/074090, dated May 2, 2018, WIPO, 4 pages.

ISA State Intellectual Property Office of the People's Republic of China, Written Opinion of the International Searching Authority Issued in Application No. PCT/CN2018/074118, dated May 7, 2018, WIPO, 8 pages.

* cited by examiner

ESTABLISHING ENTRY CORRESPONDING TO EQUAL-COST PATHS

CROSS REFERENCE TO RELATED APPLICATIONS

The present application is a U.S. National Phase of International Application No. PCT/CN2018/074118, entitled "ENTRY CREATION FOR EQUAL COST PATHS", and filed on Jan. 25, 2018. International Application No. PCT/CN2018/074118 claims priority to Chinese Patent Application No. 201710056621.5 entitled "METHOD AND DEVICE FOR ESTABLISHING AN ENTRY CORRESPONDING TO EQUAL-COST ROUTES", and filed on Jan. 25, 2017. The entire contents of each of the above-listed applications are hereby incorporated by reference for all purposes.

BACKGROUND

As network applications are rapidly developing, Equal-Cost Multipath (ECMP) is widely applied. For ECMP, flows can be equally distributed in various paths, so as to implement load sharing.

DETAILED DESCRIPTION OF THE EMBODIMENTS

The technical solutions of examples of the present disclosure will be described clearly and fully below in combination with drawings in the examples of the present disclosure. It is apparent that the described examples are merely part of examples of the present disclosure rather than all examples. Other examples achieved by those of ordinary skill in the art based on the examples in the present disclosure without paying creative work shall all fall into the scope of protection of the present disclosure.

A Forward Information DataBase (FIB) table and an ECMP table may be maintained on a Provider Edge (PE) device to implement ECMP in a Multi-Protocol Label Switching (MPLS) Layer 3 Virtual Private Network (L3VPN). Each FIB entry in the FIB table may include the number of ECMP entries in a corresponding ECMP table. The ECMP table may include M ECMP entries, and each of the ECMP entries may include an inner label, where M is equal to the number of paths which are equal cost with each other. In an example, paths 1 to 3 are configured to be the equal-cost paths. The ECMP table includes three ECMP entries. The ECMP entry 1 may include an inner label corresponding to the path 1. The ECMP entry 2 may include an inner label corresponding to the path 2. The ECMP entry 3 may include an inner label corresponding to the path 3.

After receiving a packet, the PE device may search out an FIB entry matched with the packet from the FIB table, determine an inner label corresponding to the packet based on the number of the ECMP entries of the ECMP table in the FIB entry, and send the packet based on the inner label and a path corresponding to the inner label.

However, when a new path is added to the equal-cost paths or a path is deleted from the equal-cost paths, the number of the ECMP entries of the ECMP table may be changed. For example, when a path 4 is added to the equal-cost paths, the number of the ECMP entries in the ECMP table may be changed to 4. The number of the ECMP entries of the ECMP table recorded in the FIB entry may be further changed. Since there are a great amount of corresponding FIB entries, it may take a long time period to modify contents of the corresponding FIB entries, the corresponding FIB entries cannot be used for packet sending in the time period, which cause packet loss.

Figure 1:
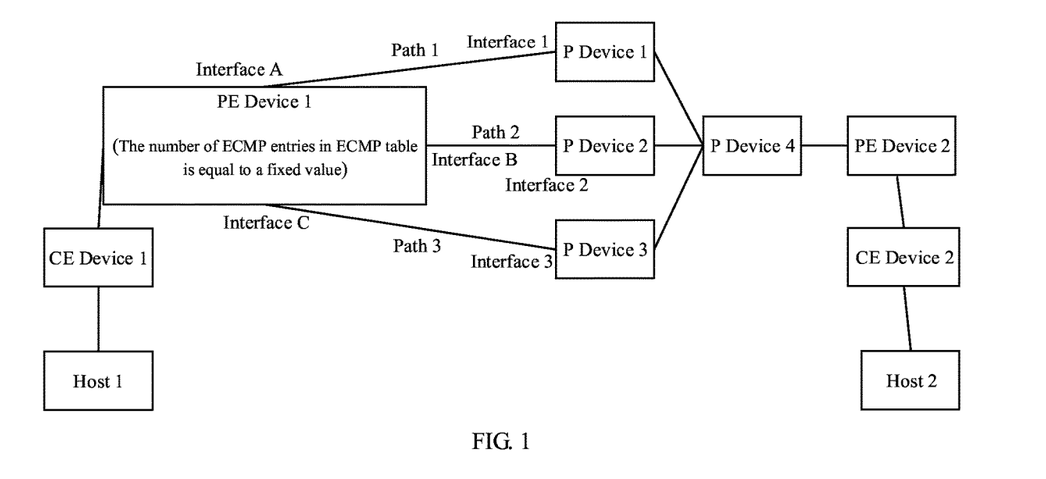
FIG. 1 is a schematic diagram illustrating an application scenario of a Multi-Protocol Label Switching (MPLS) Layer 3 Virtual Private Network (L3VPN) based on an example of the present disclosure.

A method of establishing an entry corresponding to equal-cost paths is provided according to an example of the present disclosure. The method may be applied to a network device (e.g., a PE device) in an MPLS L3VPN. The method may further be applied to another MPLS network, which may not be limited in examples of the present disclosure. FIG. 1 is a schematic diagram illustrating an application scenario based on an example of the present disclosure. In the application scenario in FIG. 1, there are Provider Edge (PE) devices, Customer Edge (CE) devices, Provider (P) devices and hosts. The method may be applied to a PE device in FIG. 1.

Figure 2:
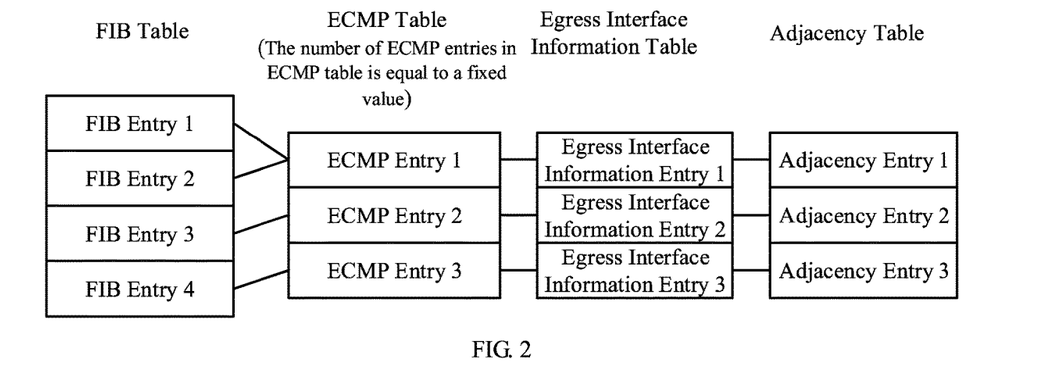
FIG. 2 is a schematic diagram illustrating a relationship of an FIB table, an ECMP table, an egress interface information table and an adjacency table based on an example of the present disclosure.

In an example, the PE device may maintain an FIB table, an ECMP table, an egress interface information table and an adjacency table. FIG. 2 is a schematic diagram illustrating a relationship of a FIB table, an ECMP table, an egress interface information table and an adjacency table. Each entry in the FIB table may be an FIB entry. Each entry in the ECMP table may be an ECMP entry. Each entry in the egress interface information table may be an egress interface information entry. Each entry in the adjacency table may be an adjacency entry.

A FIB entry may include contents such as an IP address, the number of ECMP entries in the ECMP table associated with the FIB entry, and an identifier of the ECMP table. An ECMP entry may include contents such as an inner label and an index of an outer label. An egress interface information entry may include contents such as an index of an outer label, the outer label, and an index of an adjacency table. An adjacency entry may include contents such as an index of an adjacency table, an egress interface, a source Media Access Control (MAC) address (e.g., a MAC address of the egress interface), a destination MAC address (e.g., an MAC address of a next hop of the egress interface), and information of a Virtual Local Area Network (VLAN) (e.g., the VLAN to which the egress interface belongs).

In an example, at least two paths of the PE device are configured to be equal-cost paths. In FIG. 1, the path 1, the path 2 and the path 3 are configured to be equal-cost paths, and the equal-cost paths correspond to an ECMP table, e.g., an ECMP table A. Each path corresponds to an interface, which may be a physical interface or a logic interface (e.g., an aggregation interface including a plurality of physical interfaces). For example, the path 1 corresponds to an interface A, the path 2 corresponds to an interface B and the path 3 corresponds to an interface C, etc.

In the application scenario above, Table 1 illustrates an example of an FIB table, Table 2 illustrates an example of an ECMP table, Table 3 illustrates an example of an egress interface information table, and Table 4 illustrates an example of an adjacency table. In Table 1, an IP of a host 2 is associated with an ECMP table A (e.g., the ECMP table in Table 2), and the number of the ECMP entries of the ECMP table A is equal to 3.

In Table 2, when an inner label A and an outer label 1 are assigned for the path 1, the inner label in an ECMP entry 1 is the inner label A, an outer label index in the ECMP entry 1 is an index of the outer label 1. When the inner label A and an outer label 2 are assigned for the path 2, the inner label in an ECMP entry 2 is the inner label A, and an outer label index in the ECMP entry 2 is an index of the outer label 2. When the inner label A and an outer label 3 are assigned for the path 3, an inner label in an ECMP entry 3 is the inner label A, and an outer label index in the ECMP entry 3 is an index of the outer label 3.

In Table 3, an egress interface information entry 1 corresponding to the path 1 includes the index of the outer label 1, the outer label 1 and an adjacency table index 1, where the adjacency table index 1 corresponds to an adjacency entry corresponding to an interface A of the path 1. An egress interface information entry 2 for the path 2 includes the index of the outer label 2, the outer label 2, and an adjacency table index 2, where the adjacency table index 2 corresponds to an adjacency entry corresponding to an interface B of the path 2. An egress interface information entry 3 for the path 3 includes the index of the outer label 3, the outer label 3, and an adjacency table index 3, where the adjacency table index 3 corresponds to an adjacency entry corresponding to an interface C of the path 3.

In Table 4, an adjacency entry 1 corresponding to the path 1 includes the adjacency table index 1, the interface A, an MAC address of the interface A, an MAC address of an interface 1, and a VLAN of the interface A. An adjacency entry 2 corresponding to the path 2 includes the adjacency table index 2, the interface B, an MAC address of the interface B, an MAC address of an interface 2, and a VLAN of the interface B. An adjacency entry 3 corresponding to the path 3 includes the adjacency table index 3, the interface C, an MAC address of the interface C, an MAC address of an interface 3, and a VLAN of the interface C.

TABLE 1

| IP Address | Number of ECMP Entries of ECMP Table | Identifier of ECMP Table |
|---|---|---|
| IP address of host 2 | 3 | ECMP table A |

TABLE 2

| Inner Label | Index of Outer Label |
|---|---|
| Inner label | Index of outer label 1 |
| Inner label | Index of outer label 2 |
| Inner label | Index of outer label 3 |

TABLE 3

| Index of Outer Label | Outer Label | Adjacency Table Index |
|---|---|---|
| Index of outer label 1 | Outer label 1 | Adjacency table index 1 |
| Index of outer label 2 | Outer label 2 | Adjacency table index 2 |
| Index of outer label 3 | Outer label 3 | Adjacency table index 3 |

TABLE 4

| Adjacency Table Index | Egress Interface | Source MAC Address | Destination MAC Address | VLAN Information |
|---|---|---|---|---|
| Adjacency table index 1 | Interface A | MAC address of interface A | MAC address of interface 1 | VLAN of interface A |
| Adjacency table index 2 | Interface B | MAC address of interface B | MAC address of interface 2 | VLAN of interface B |
| Adjacency table index 3 | Interface C | MAC address of interface C | MAC address of interface 3 | VLAN of interface C |

In the application scenario above, when a new path is added to the equal-cost paths or a path is deleted from the equal-cost paths, the number of ECMP entries recorded in the corresponding FIB entry is changed. For example, when the path 3 is deleted from the equal-cost paths due to a fault of the interface C, the number of the ECMP entries recorded in the ECMP table may change to be 2, and the number of the ECMP entries recorded in the corresponding FIB entry is changed to be 2 accordingly.

In an example, when the inner labels corresponding to different paths (e.g., the paths 1 to 3) are same, each FIB entry in the FIB table maintained by the PE device may include contents such as an IP address, the number of the ECMP entries in the ECMP table associated with the FIB entry, an identifier of the ECMP table, and an inner label, each ECMP entry in the ECMP table maintained by the PE device may include contents such as an index of an outer label, each egress interface information entry in the egress interface information table maintained by the PE device may include contents such as an index of an outer label, the outer label, and an adjacency table index. Each adjacency entry in the adjacency table maintained by the PE device may include contents such as an adjacency table index, an egress interface, a source MAC address, a destination MAC address, and VLAN information.

The number of the ECMP entries of the ECMP table in each FIB entry of the FIB table may be a preset fixed value, e.g., 256. Table 5 illustrates an example of the FIB table above. In the FIB table in Table 5, an IP address of a host 2 is associated with an ECMP table A (the ECMP table shown in Table 6), and the number of the ECMP entries of the ECMP table A is 256.

In an example, the FIB entry may further include an inner label. Since the inner labels assigned for the paths 1 to 3 are same in Table 2, e.g., the inner label A, the inner label A may be set in the FIB entry. Table 5 illustrates a maintained FIB table.

TABLE 5

| IP Address | Number of ECMP Entries of ECMP table | Identifier of ECMP Table | Inner-Layer Label |
|---|---|---|---|
| IP address of host 2 | 256 | ECMP table A | Inner label A |

Since the inner label is set in the FIB entry, the inner label may not be included in each ECMP entry of the ECMP table. In an example, the ECMP entry includes an index of an outer label. Each egress interface information entry in the egress interface information table may include contents such as an index of an outer label, the outer label and an adjacency table index, which is as shown in Table 3 and not be repeatedly described herein. Each adjacency entry in the adjacency table may include contents such as an adjacency table index, an egress interface, a source MAC address, a destination MAC address and VLAN information, which is as shown in Table 4 and not be repeatedly described here.

Figure 3:
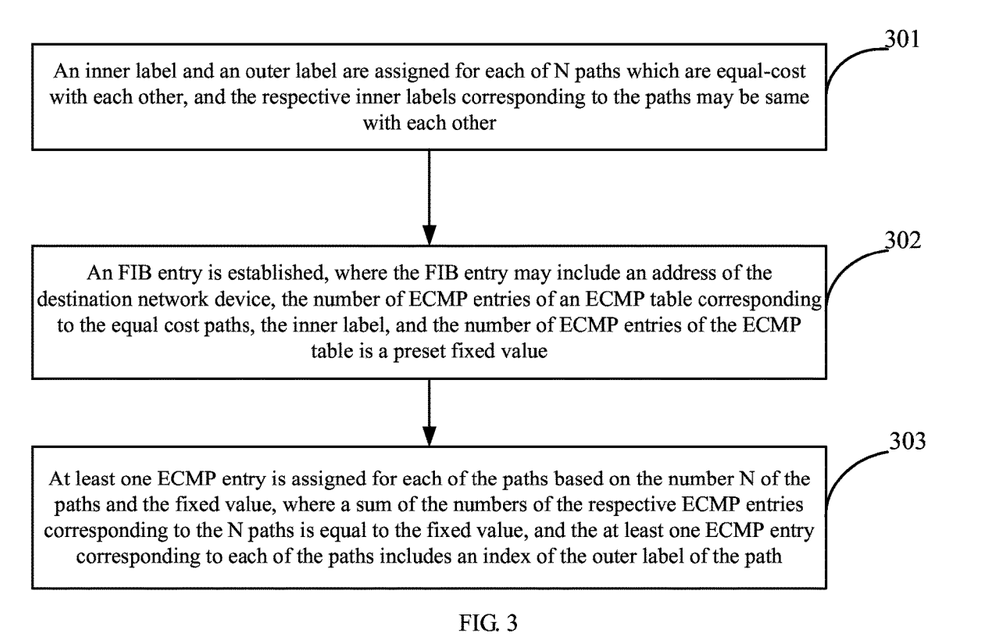
FIG. 3 is a flowchart illustrating a method of establishing an entry corresponding to equal-cost paths based on an example of the present disclosure.

In the application scenario above, a method of establishing an entry corresponding to equal-cost paths is provided. In an example, the method may be applied to a network device, and at least two paths between the network device and a destination device may be configured to be equal-cost paths. In FIG. 3, the method includes procedures as follows.

At block 301, an inner label and an outer label are assigned for each of N paths which are equal cost with each other, the respective inner labels corresponding to the paths is same with each other, and N is an integer more than or equal to 2. For example, an inner label A and an outer label 1 is assigned for the path 1, the inner label A and an outer label 2 is assigned for the path 2 and the inner label A and an outer label 3 is assigned for the path 3.

At block 302, an FIB entry is established, where the FIB entry includes an address of the destination network device, the number of ECMP entries of an ECMP table corresponding to the equal-cost paths, the inner label, and the number of ECMP entries of the ECMP table is a preset fixed value.

In an example, the FIB entry is shown in Table 5, which is not repeatedly described here.

At block 303, at least one ECMP entry is assigned for each of the paths based on the number N of the paths and the fixed value (which is equal to the number of the ECMP entries of the ECMP table), where a sum of the numbers of the respective ECMP entries corresponding to the N paths is equal to the fixed value, and the at least one ECMP entry corresponding to each of the paths includes an index of the outer label of the path.

In an example, the process of assigning the at least one ECMP entry for each of the paths based on the number N of the paths and the fixed value includes procedures as follows. A first numerical value K is determined by rounding down the fixed value divided by the number N of the paths. A remainder of dividing the fixed value by the number N of the paths is determined to be a second numerical value M. When the second numerical value M is equal to 0, it is determined that the number of the at least one ECMP entry corresponding to each of the paths is the first numerical value K. When the second numerical value M is more than 0, M paths is selected from the N paths, and it is determined that the number of the at least one ECMP entry corresponding to each of the selected M paths is equal to the first numerical value K plus 1, and the number of the at least one ECMP entry corresponding to each of remaining paths in the N paths is equal to the first numerical value K.

For example, the number of the ECMP entries of the ECMP table is a fixed value, e.g., 256.

In FIG. 1, the paths 1 to 3 are configured to be equal-cost paths. The number of the equal-cost paths is equal to 3.

It is assumed that the fixed value is 256, and the number N of the equal-cost paths is equal to 3. In the process of assigning the ECMP entries for each of the paths based on the number N of the equal-cost paths and the fixed value, it is determined that the first numerical value K corresponding to each of the paths is equal to 85 (obtained by rounding down 256/3). The remainder of 256 divided by 3 (the second numerical value M) is equal to 1. The path 1 may be randomly selected from the paths 1 to 3, and the number of the ECMP entries assigned for the path 1 is equal to (85+1)=86, the number of the ECMP entries assigned for each of the remaining paths 2 and 3 is equal to (85+0)=85.

In another example, it is assumed that the fixed value is 256, and the number N of the equal-cost paths is 8. It may be determined that the first numerical value K corresponding to each path is equal to 32 (obtained by rounding down 256/8). Since the remainder of 256 divided by 8 is equal to 0, the number of the ECMP entries assigned for each of the equal-cost paths is equal to 32.

In an example, it is assumed that the number of the ECMP entries corresponding to the path 1 is 86, the number of the ECMP entries corresponding to the path 2 is 85, and the number of the ECMP entries corresponding to the path 3 is 85. 86 ECMP entries are assigned for the path 1, and each of the 86 ECMP entries corresponding to the path 1 includes the index of the outer label corresponding to the path 1 (e.g., the index of the outer label 1). 85 ECMP entries are assigned for the path 2, and each of the 85 ECMP entries corresponding to the path 2 includes the index of the outer label corresponding to the path 2 (e.g., the index of the outer label 2). 85 ECMP entries are assigned for the path 3, and each of the 85 ECMP entries corresponding to the path 3 includes the index of the outer label corresponding to the path 3 (i.e., the index of the outer label 3).

Table 6 illustrates an example of the ECMP table. In Table 6, there are 86 indices of the outer label 1 corresponding to the path 1, 85 indices of the outer label 2 corresponding the path 2, and 85 indices of the outer label 3 corresponding to the path 3. In another example, an index sequence may be an sequence of the index of the outer label 1, the index of the outer label 2, the index of the outer label 3, the index of the outer label 1, and so on.

TABLE 6

| Index of Outer-Layer Label |
|---|
| Index of outer label 1 |
| . . . (the total number of indices of outer label 1 is equal to 86) |
| Index of outer label 2 |
| . . . (the total number of indices of outer label 2 is equal to 85) |
| Index of outer label 3 |
| . . . (the total number of indices of outer label 3 is equal to 85) |

In an example, when the number of the equal-cost paths is changed to be N' (e.g., adding or deleting a path), at least one ECMP entry is re-assigned for each of N' paths based on the number N' of the paths and the fixed value, where N' is an integer more than or equal to 2.

In an example, when a new path is added to the equal-cost paths (e.g., the inner label of the added path is the same as the inner label of the equal-cost paths), for each of the N paths, the number of at least one decreased ECMP entry corresponding to the path is determined, at least one ECMP entry with the determined number is selected from the at least one ECMP entry corresponding to the path, and for each of the N paths, the selected at least one ECMP entry of the path is assigned for the added path. The process of determining, for each of the N paths, the number of the at least one decreased ECMP entry corresponding to the path may include procedures as follows. The number N" of the equal-cost paths after the new path is added is determined, where N" is an integer more than or equal to 2. For each of the N" paths, the number H of the at least one ECMP entry corresponding to the path is determined based on the number N" and the fixed value. For each of the N paths, it is determined that the number of the at least one decreased ECMP entry corresponding to the path is equal to (K+1)−H or K−H.

For example, it is assumed that the fixed value is 256, the number of the equal-cost paths is 3. The number of the ECMP entries corresponding to the path 1 is equal to 86, the number of the ECMP entries corresponding to the path 2 is equal to 85, and the number of the ECMP entries corresponding to the path 3 is equal to 85. When a path 4 is added, it is determined that the number of the at least of ECMP entries corresponding to each of the paths 1 to 4 is equal to 64.

A record corresponding to the path 4 may be added to the egress interface information table in Table 3. For example, a correspondence of the index of an outer label 4, the outer label 4 (e.g., the outer label for the path 4) and an adjacency table index 4 is added to the egress interface information table. A record corresponding to the path 4 is added to the adjacency table in Table 4. For example, a correspondence of an adjacency table index 4, an interface D (e.g., the interface corresponding to the path 4), the MAC address of the interface D, the MAC address of a peer interface connected with the interface D, and a VLAN to which the interface D belongs is added to the adjacency table.

Further, the number of the ECMP entries corresponding to each of the paths 1 to 4 is equal to 64. In the ECMP table shown in Table 6, 64 ECMP entries are assigned for the path 1, and the index of the outer label corresponding to the path 1 is respectively recorded in the 64 ECMP entries; 64 ECMP entries are assigned for the path 2, and the index of the outer label corresponding to the path 2 is respectively recorded in the 64 ECMP entries; 64 ECMP entries are assigned for the path 3, and the index of the outer label corresponding to the path 3 is respectively recorded in the 64 ECMP entries; 64 ECMP entries are assigned for the path 4, and the index of the outer label corresponding to the path 4 is respectively recorded in the 64 ECMP entries.

Further, when the path 4 is added, the number of the ECMP entries assigned for each of the paths 1 to 3 may be decreased. In an example, the network device determines the number of the at least one decreased ECMP entries corresponding to each of the paths 1 to 3. The number of the decreased ECMP entries corresponding to the path 1 is equal to (86−64)=22. The number of the decreased ECMP entries corresponding to the path 2 is equal to (85−64)=21. The number of the decreased ECMP entries corresponding to the path 3 is equal to (85−64)=21. 22 ECMP entries are randomly selected from the ECMP entries corresponding to the path 1, the index of the outer label corresponding to the path 1 in each of the 22 ECMP entries is deleted, and the index of the outer label corresponding to the path 4 is respectively recorded in each of the 22 ECMP entries. 21 ECMP entries are randomly selected from the ECMP entries corresponding to the path 2, the index of the outer label recorded in each of the 21 ECMP entries is deleted, and the index of the outer label corresponding to the path 4 is respectively recorded in each of the 21 ECMP entries. 21 ECMP entries are randomly selected from the ECMP entries corresponding to the path 3, the index of the outer label recorded in each of the 21 ECMP entries is deleted, and the index of the outer label corresponding to the path 4 is respectively recorded in each of the 21 ECMP entries.

In another example, when the path 4 is added, the indices of the outer labels in 256 ECMP entries are respectively deleted, and the 256 ECMP entries are re-assigned for the paths 1 to 4.

In an example, when a path is deleted from the equal-cost paths, the number N''' of the equal-cost paths after the path is deleted is determined, where N''' is an integer more than or equal to 2, for each of the N''' paths, the number of at least one added ECMP entry corresponding to the path is determined, and the at least one ECMP entry corresponding to the deleted path is assigned to the N''' paths based on the numbers of the respective added ECMP entries corresponding to the N''' paths.

The process of determining, for each of the N''' paths, the number of at least one added ECMP entry corresponding to the path includes procedures as follows. For each of the N''' paths, the number H' of the at least one ECMP entry corresponding to the path is determined based on the number N''' and the fixed value. For each of the N''' paths, it is determined that the number of the at least one added ECMP entry corresponding to the path is equal to H'−(K+1) or H'−K.

In an example, the fixed value is 256, and the number of the equal-cost paths is equal to 3. The number of the ECMP entries corresponding to the path 1 is equal to 86. The number of the ECMP entries corresponding to the path 2 is equal to 85. The number of the ECMP entries corresponding to the path 3 is equal to 85. After the path 3 is deleted, the number of the ECMP entries corresponding to the path 1 is equal to 128, and the number of the ECMP entries corresponding to the path 2 is equal to 128.

A record corresponding to the path 3, e.g., a correspondence of the index of the outer label 3, the outer label 3 and the adjacency table index 3, may be respectively deleted from the egress interface information table shown in Table 3. A record corresponding to the path 3, for example, a correspondence of the adjacency table index 3, the interface C, the MAC address of the interface C, the MAC address of the interface 3, and the VLAN to which the interface C belongs, may be deleted from the adjacency table shown in Table 4.

Further, since the number of the entries corresponding to each of the paths 1 and 2 after the path 3 is deleted is equal to 128. In the ECMP table shown in Table 6, the network device assigns 128 ECMP entries for the path 1 and record the index of the outer label corresponding to the path 1 respectively into the 128 ECMP entries, and the network device assigns 128 ECMP entries for the path 2 and record the index of the outer label corresponding to the path 2 into the 128 ECMP entries.

Further, when the path 3 is deleted, the number of the entries corresponding to each of the remaining paths 1 and 2 is increased. The network device may determine the number of the increased ECMP entries corresponding to each of the remaining paths 1 and 2. For example, the number of the increased ECMP entries corresponding to the path 1 is equal to (128−86)=42, and the number of the increased ECMP entries corresponding to the path 2 is equal to (128−85)=43. The network device deletes the index of the outer label recorded in each of 85 ECMP entries corresponding to the path 3. The network device randomly selects 42 ECMP entries from the 85 ECMP entries, and records the index of the outer label corresponding to the path 1 in each of the 42 ECMP entries. The network device further records the index of the outer label corresponding to the path 2 in each of remaining 43 entries. Further, after the index corresponding to the path 3 in each of the 85 ECMP entries corresponding to the path 3 is deleted, the index of the outer label corresponding to the path 1 and the index of the outer label corresponding to the path 2 may sequentially be recorded in a polling manner. For example, for the 85 ECMP entries corresponding to the path 3, the index of the outer label corresponding to the path 1 is recorded in a first ECMP entry, the index of the outer label corresponding to the path 2 is recorded in a second ECMP entry, the index of the outer label corresponding to the path 1 is recorded in a third ECMP entry, and so on.

In another example, the indices of the outer labels recorded in 256 ECMP entries are deleted when the path 3 is deleted, and the ECMP entries are re-assigned for the path 1 and the path 2.

In an example, in the cases of adding the path 4 or deleting the path 3, for each path, to determine which at least one ECMP entry corresponds to the path, the network device can maintain a correspondence between paths and ECMP entries when maintaining the ECMP table shown in Table 6. For example, the path 1 corresponds to ECMP entries from 1st to 85th, and so on.

Based on the application scenarios, a packet sending process may include procedures as follows. After a packet is received, a FIB entry matched with the packet is determined. The number of ECMP entries of an ECMP table and an inner label are searched out from the FIB entry. An ECMP entry matched with the packet is determined in the ECMP table based on the number of the ECMP entries. The index of the outer label is obtained from the ECMP entry. The outer label corresponding to the index is obtained. The packet is modified based on the inner label and the outer label. The modified packet is sent through a path corresponding to the outer label.

In an example, after receiving the packet, the network device may search out the FIB entry matched the destination IP address of the packet, e.g., the IP address in the FIB entry is same as the destination IP address of the packet. For example, after receiving the packet sent from a host 1 to a host 2, the network device may search out the FIB entry as shown in Table 5 because the destination IP address is same as the IP address of the host 2. The FIB entry includes the number 256 of the ECMP entries of the ECMP table and the inner label A. The number 256 of the ECMP entries and the inner label A can be searched out from the FIB entry, and the number 256 of the ECMP entries is a fixed value.

The process of determining the ECMP entry matched with the packet in the ECMP table based on the number of the ECMP entries may include procedures as follows. A random value (the random value may be a positive integer) is generated. A location matched with the packet is determined based on the random value and the number of the ECMP entries. The ECMP entry associated with the location in the ECMP table is determined. For example, a remainder of the random value divided by the number of the ECMP entries is obtained, a location matched with the packet is determined based on the remainder, and the ECMP entry associated with the location is determined in the ECMP table, e.g., a (remainder+1)th ECMP entry in the ECMP table. For example, the generated random value is 10, the remainder of 10/256 is equal to 10, and it is determined that the packet is matched with the 11th ECMP entry of the ECMP table. For another example, the generated random value is 256, the remainder of 256/256 is equal to 0, and it is determined that the packet is matched with the 1st ECMP entry of the ECMP table. The remainder of the random value divided by 256 can be equally distributed to the 256 ECMP entries because the random value is generated randomly in a way that equal distribution can be implemented in the 256 ECMP entries.

In an example, since the ECMP entry includes the index of the outer label, the index of the outer label may be searched out from the ECMP entry. For example, the index of the outer label 1 is searched out from the first ECMP entry.

In an example, the process of obtaining the outer label corresponding to the index includes procedures as follows. The egress interface information table includes a correspondence between an index of an outer label and the outer label. After obtaining the index of the outer label, the outer label corresponding to the index is obtained by querying the egress interface information table based on the index. For example, after the index of the outer label 1 is obtained, the outer label 1 corresponding to the index is obtained by querying the egress interface information table shown in Table 3 based on the index of the outer label 1.

In an example, the process of modifying the packet through the inner label and the outer label includes that the network device encapsulates the packet. For example, the packet is encapsulated through the inner label A and the outer label 1.

In an example, the process of sending the modified packet through the path corresponding to the outer label includes procedures as follows. The egress interface information table is queried based on the outer label to obtain an adjacency table index corresponding to the outer label. An adjacency entry corresponding to the adjacency table index is searched out. Further, the modified packet above may be encapsulated based on the source MAC address, the destination MAC address and the VLAN information recorded in the adjacency entry. The encapsulated packet is sent through the path corresponding to the adjacency entry.

In an example, the process of querying the egress interface information table based on the outer label to obtain the adjacency table index corresponding to the outer label and searching out the adjacency entry corresponding to the adjacency table index includes procedures as follows. After the outer label 1 is obtained, the egress interface information table shown in Table 3 is queried based on the outer label 1 to obtain the adjacency table index 1 corresponding to the outer label 1. The adjacency table shown in Table 4 is queried based on the adjacency table index 1 to obtain the adjacency entry corresponding to the adjacency table index 1, e.g., a first adjacency entry in the adjacency table.

In an example, the adjacency entry includes content such as an egress interface, a source MAC address, a destination MAC address and VLAN information. The above modified packet (e.g., the packet including the inner label A and the outer label 1) is encapsulated based on the source MAC address (e.g., the MAC address of the interface A), the destination MAC address (e.g., the MAC address of the interface 1), the VLAN information (e.g., the VLAN to which the interface 1 belongs). The encapsulated packet is sent through a path corresponding to the adjacency entry (e.g., the interface A in the adjacency entry).

Based on the process above, the network device can send packets by maintaining the different tables above.

Figure 4:
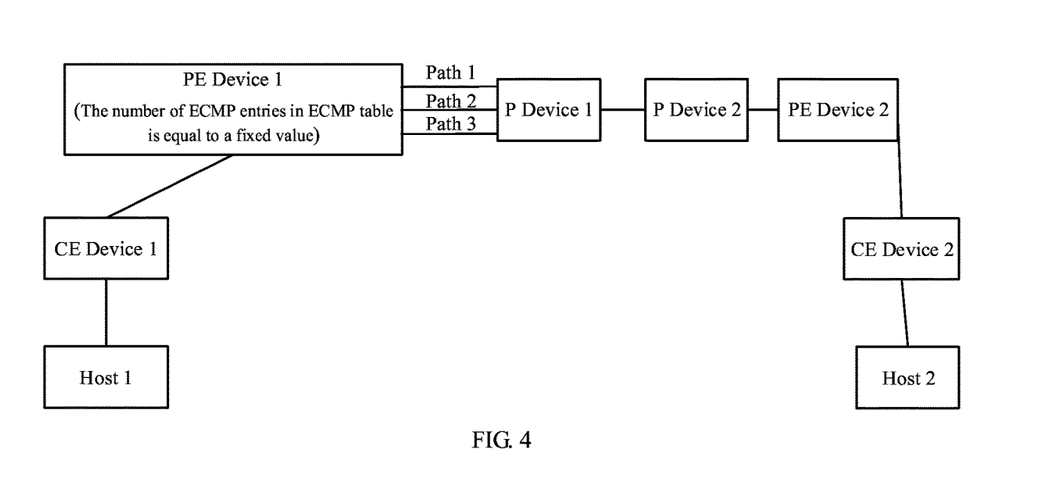
FIG. 4 is a schematic diagram illustrating an application scenario of an MPLS L3VPN based on an example of the present disclosure.

In an example, the inner label above is a private network label or a public network label. Further, the private network label may be assigned though a prefix way or through a VPN way. In another example, the inner label above is a public network label, and the outer label is an invalid value. In FIG. 4, a public network label A is respectively assigned for the paths 1 to 3. No private network label is assigned. The public network label A is set as the inner label and recorded in the corresponding FIB entry. The outer label is set as an invalid value because the public network label A is set as the inner label. For example, the outer label of the path 1 is set as an invalid value 1, the outer label of the path 2 is set as an invalid value 2, and the outer label of the path 3 is set as an invalid value 3, which are recorded in the egress interface information table.

In an example, the network device may send the packet through a Central Processing Unit (CPU). In another example, the network device may send the packet through a hardware chip such as a Field Programmable Gate Array (FPGA), an Application Specific Integrated Circuit (ASIC) and a Network Processor (NP).

When the packet is sent through the CPU, the CPU may maintain the FIB table, the ECMP table and the adjacency table, and send the packet based on the FIB table, the ECMP table and the adjacency table when receiving the packet. When the packet is sent through the hardware chip, the CPU generates the FIB table, the ECMP table and the adjacency table, and sends the FIB table, the ECMP table and the adjacency table to the hardware chip, and the hardware chip sends the packet based on the CPU, the FIB table, the ECMP table and the adjacency table when receiving the packet.

In examples above of the present disclosure, in a MPLS L3VPN with ECMP, when a path is added to the equal-cost paths or deleted from the equal-cost paths, the numbers of at least one ECMP entry corresponding to each of the paths is adjusted while the number of the ECMP entries in the ECMP table is not changed. Thus, the content of the FIB entry cannot be updated because the number of the ECMP entries of the ECMP table in the FIB entry is not changed, and the FIB entry can still be used to send packets in a way that packet loss can be avoided, and user experience can be improved.

It is assumed that a path is added to the equal-cost paths or deleted from the equal-cost paths, e.g., one path is deleted from 16 paths, the ECMP entries are desired to be updated, the FIB entry is further desired to be updated because the number of the ECMP entries is changed. It is assumed that there are 100,000 FIB entries associated with the ECMP entries. A time period when the ECMP entries and the FIB entries are updated is about 1 s. In examples of the present disclosure, when the path is added to the equal-cost paths or deleted from the equal-cost paths, e.g., one path is deleted from 16 paths, the ECMP entries are updated while the FIB entries are not updated because the number of the ECMP entries is not changed. Even though there are a large amount of FIB entries associated with the ECMP entries, the time period of updating the ECMP entries is about 20 ms, which can save the updating time period 50 times.

Methods according to the present disclosure are described above. Devices according to the present disclosure are described below.

Figure 5:
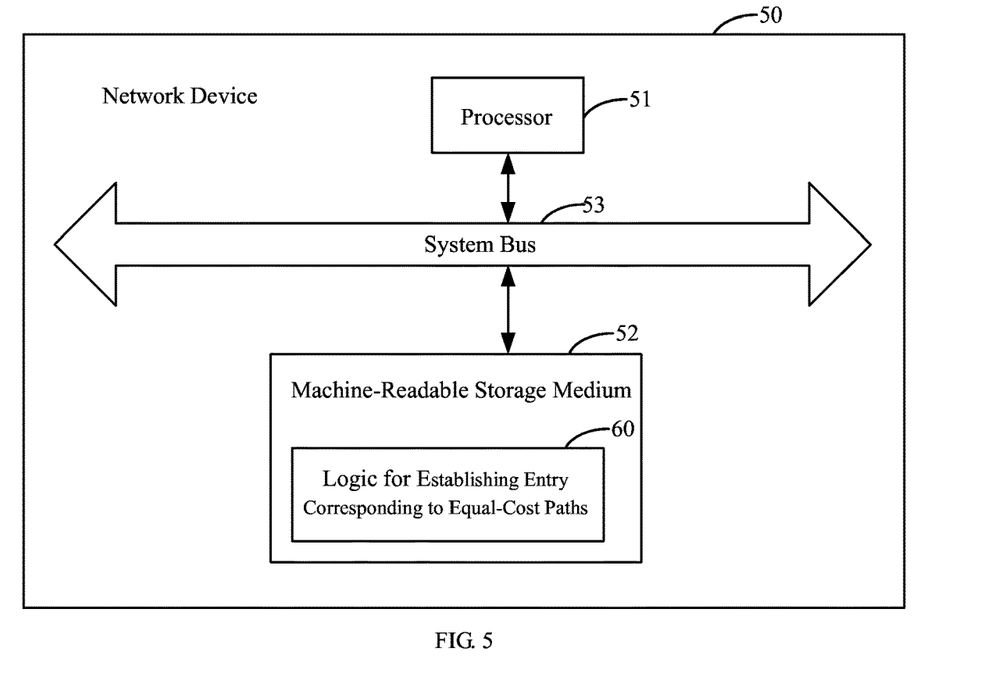
FIG. 5 is a diagram illustrating a hardware structure of a network device based on an example of the present disclosure.

FIG. 5 schematically illustrates a hardware structure diagram of a network device, which is provided by an example of the present disclosure. The network device 50 may include a processor 51 and a machine-readable storage medium 52 storing machine executable instructions. The processor 51 may communicate with the machine-readable storage medium 52 via a system bus 53, and execute the method of establishing an entry corresponding to equal-cost paths described above by reading and executing the machine executable instructions corresponding to a control logic 60 for establishing an entry corresponding to equal-cost paths in the machine-readable storage medium 52.

As used herein, the machine-readable storage medium 52 may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof.

Figure 6:
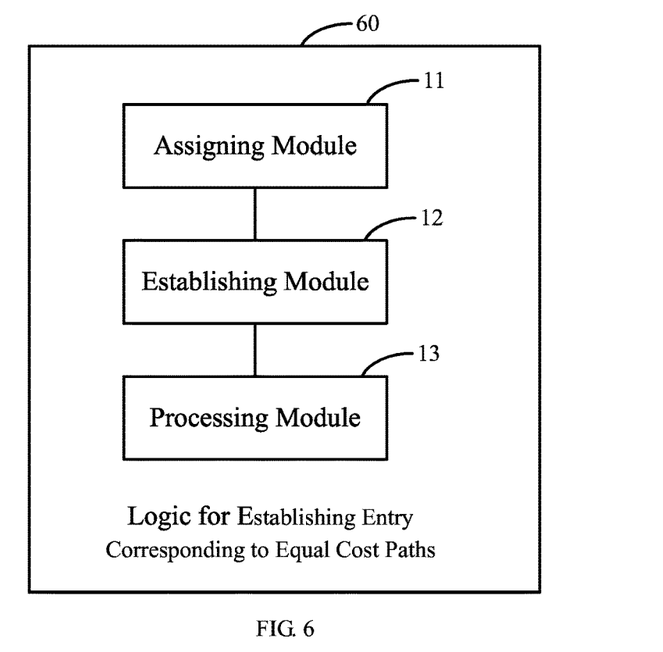
FIG. 6 is a diagram illustrating a structure of a logic for establishing an entry corresponding to equal-cost paths based on an example of the present disclosure.

As shown in FIG. 6, functionally divided, the logic 60 for establishing an entry corresponding to equal-cost paths above may include modules as follows.

An assigning module 11 is configured to assign an inner label and an outer label for each of N paths configured to be equal cost with each other between the network device and a destination network device, wherein the respective inner labels corresponding to the paths are same with each other, and N is an integer more than or equal to 2.

An establishing module 12 is configured to establish a Forward Information DataBase (FIB) entry, wherein the FIB entry comprises an address of the destination network device, the number of Equal-Cost Multi-Path Routing (ECMP) entries in an ECMP table corresponding to the paths, and the same inner label, and the number of the ECMP entries in the ECMP table is equal to a preset fixed value.

A processing module 13 is configured to assign at least one ECMP entry for each of the paths based on the number N of the paths and the fixed value, wherein a sum of the numbers of the respective ECMP entries corresponding to the N paths is equal to the fixed value, and the at least one ECMP entry corresponding to each of the paths comprises an index of the outer label of the path.

In an example, the processing module 13 is configured to determine a first numerical value K by rounding down a quotient obtained by dividing the fixed value by the number N of the paths; determine a remainder of dividing the fixed value by the number N of the paths to be a second numerical value M; when the second numerical value M is equal to 0, determine that the number of the at least one ECMP entry corresponding to each of the paths is the first numerical value K; when the second numerical value M is more than 0, select M paths from the N paths, determine that the number of the at least one ECMP entry corresponding to each of the selected M paths is equal to the first numerical value K plus 1, and the number of the at least one ECMP entry corresponding to each of remaining paths in the N paths is equal to the first numerical value K.

In an example, the processing module 13 is further configured to when the number of the paths is changed to be N', re-assign at least one ECMP entry for each of N' paths based on the number N' of the paths and the fixed value, where N' is an integer more than or equal to 2.

In an example, the processing module 13 is further configured to when a new path is added to the paths that are equal cost with each other, determine for each of the N paths, the number of at least one decreased ECMP entry corresponding to the path, select at least one ECMP entry with the determined number from the at least one ECMP entry corresponding to the path; and assign, for each of the N paths, the selected at least one ECMP entry of the path for the added path.

In an example, the processing module 13 is configured to determine the number N" of the paths that are equal cost with each other after the new path is added; determine, for each of the N" paths, where N" is an integer more than or equal to 2, the number H of the at least one ECMP entry corresponding to the path based on the number N" and the fixed value; and determine, for each of the N paths, that the number of the at least one decreased ECMP entry corresponding to the path is equal to (K+1)−H or K−H.

In an example, the processing module 13 is further configured to when a path is deleted from the paths that are equal cost with each other, determine the number N''' of the paths that are equal cost with each other after the path is deleted, where N''' is an integer more than or equal to 2; determine, for each of the N''' paths, the number of at least one added ECMP entry corresponding to the path, and assign the at least one ECMP entry corresponding to the deleted path to the N''' paths based on the numbers of the respective added ECMP entries corresponding to the N''' paths.

In an example, the processing module 13 is configured to determine, for each of the N''' paths, the number H' of the at least one ECMP entry corresponding to the path based on the number N''' and the fixed value; and determine, for each of the N''' paths, that the number of the at least one added ECMP entry corresponding to the path is equal to H'−(K−1) or H'−K.

Since the device embodiments substantially correspond to the method embodiments, a reference may be made to part of the descriptions of the method embodiments for the related part. The device embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and a device provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method of establishing an entry corresponding to equal-cost paths, comprising:
assigning, by a network device, an inner label and an outer label for each of N paths configured to be equal cost with each other between the network device and a destination network device, wherein the respective inner labels corresponding to the paths are same with each other, and N is an integer more than or equal to 2;
establishing, by the network device, a Forward Information DataBase (FIB) entry, wherein the FIB entry comprises an address of the destination network device, the number of Equal-Cost Multi-Path Routing (ECMP) entries in an ECMP table corresponding to the paths, and the same inner label, and the number of the ECMP entries in the ECMP table is equal to a preset fixed value; and
assigning, by the network device, at least one ECMP entry for each of the paths based on the number N of the paths and the fixed value, wherein a sum of the numbers of the respective ECMP entries corresponding to the N paths is equal to the fixed value, and the at least one ECMP entry corresponding to each of the paths comprises an index of the outer label of the path,
wherein assigning the at least one ECMP entry for each of the paths comprises:
determining, by the network device, a first numerical value K by rounding down a quotient obtained by dividing the fixed value by the number N of the paths;
determining, by the network device, a remainder of dividing the fixed value by the number N of the paths to be a second numerical value M;
when the second numerical value M is equal to 0,
determining, by the network device, that the number of the at least one ECMP entry corresponding to each of the paths is equal to the first numerical value K;
when the second numerical value M is more than 0,
selecting, by the network device, M paths from the N paths,
determining, by the network device, that the number of the at least one ECMP entry corresponding to each of the selected M paths is equal to the first numerical value K plus 1, and the number of the at least one ECMP entry corresponding to each of remaining paths in the N paths is equal to the first numerical value K.

2. The method according to claim 1, further comprising:
when the number of the paths is changed to be N',
re-assigning, by the network device, at least one ECMP entry for each of N' paths based on the number N' of the paths and the fixed value, wherein N' is an integer more than or equal to 2.

3. The method according to claim 1, further comprising:
when a new path is added to the paths that are equal cost with each other,
determining, by the network device, for each of the N paths, the number of at least one decreased ECMP entry corresponding to the path, selecting at least one ECMP entry with the determined number from the at least one ECMP entry corresponding to the path; and
assigning, by the network device, for each of the N paths, the selected at least one ECMP entry of the path for the added path.

4. The method according to claim 3, wherein determining, for each of the N paths, the number of the at least one decreased ECMP entry corresponding to the path comprises:
determining, by the network device, the number N" of the paths that are equal cost with each other after the new path is added, wherein N" is an integer more than or equal to 2;
determining, by the network device, for each of the N" paths, the number H of the at least one ECMP entry corresponding to the path based on the number N" and the fixed value; and
determining, by the network device, for each of the N paths, that the number of the at least one decreased ECMP entry corresponding to the path is equal to (K+1)−H or K−H.

5. The method according to claim 1, further comprising:
when a path is deleted from the paths that are equal cost with each other,
determining, by the network device, the number N''' of the paths that are equal cost with each other after the path is deleted, wherein N''' is an integer more than or equal to 2;
determining, by the network device, for each of the N''' paths, the number of at least one added ECMP entry corresponding to the path, and
assigning, by the network device, the at least one ECMP entry corresponding to the deleted path to the N''' paths based on the numbers of the respective added ECMP entries corresponding to the N''' paths.

6. The method according to claim 5, wherein determining, for each of the N''' paths, the number of at least one added ECMP entry corresponding to the path comprises:
determining, by the network device, for each of the N" paths, the number H' of the at least one ECMP entry corresponding to the path based on the number N" and the fixed value; and
determining, by the network device, for each of the N" paths, that the number of the at least one added ECMP entry corresponding to the path is equal to H'−(K+1) or H'−K.

7. A network device, comprising:
a processor, and
a non-transitory machine-readable storage medium storing machine executable instructions which are executable by the processor to:
assign an inner label and an outer label for each of N paths configured to be equal cost with each other between the network device and a destination network device, wherein the respective inner labels corresponding to the paths are same with each other, and N is an integer more than or equal to 2;
establish a Forward Information DataBase (FIB) entry, wherein the FIB entry comprises an address of the destination network device, the number of Equal-Cost Multi-Path Routing (ECMP) entries in an ECMP table corresponding to the paths, and the same inner label, and the number of the ECMP entries in the ECMP table is equal to a preset fixed value; and
assign at least one ECMP entry for each of the paths based on the number N of the paths and the fixed value, wherein a sum of the numbers of the respective ECMP entries corresponding to the N paths is equal to the fixed value, and the at least one ECMP entry corresponding to each of the paths comprises an index of the outer label of the path,
wherein the processor is caused by the machine-executable instructions to:
determine a first numerical value K by rounding down a quotient obtained by dividing the fixed value by the number N of the paths;
determine a remainder of dividing the fixed value by the number N of the paths to be a second numerical value M;
when the second numerical value M is equal to 0,
determine that the number of the at least one ECMP entry corresponding to each of the paths is equal to the first numerical value K;
when the second numerical value M is more than 0,
select M paths from the N paths,
determine that the number of the at least one ECMP entry corresponding to each of the selected M paths is equal to the first numerical value K plus 1, and the number of the at least one ECMP entry corresponding to each of remaining paths in the N paths is equal to the first numerical value K.

8. The device according to claim 7, wherein the processor is caused by the machine-executable instructions further to:
when the number of the paths is changed to be N',
re-assign at least one ECMP entry for each of N' paths based on the number N' of the paths and the fixed value, wherein N' is an integer more than or equal to 2.

9. The device according to claim 7, wherein the processor is caused by the machine-executable instructions further to:
when a new path is added to the paths that are equal cost with each other,
determine for each of the N paths, the number of at least one decreased ECMP entry corresponding to the path, select at least one ECMP entry with the determined number from the at least one ECMP entry corresponding to the path; and
assign, for each of the N paths, the selected at least one ECMP entry of the path for the added path.

10. The device according to claim 9, wherein the processor is caused by the machine-executable instructions to:
determine the number N" of the paths that are equal cost with each other after the new path is added, wherein N" is an integer more than or equal to 2;
determine, for each of the N" paths, the number H of the at least one ECMP entry corresponding to the path based on the number N" and the fixed value; and
determine, for each of the N paths, that the number of the at least one decreased ECMP entry corresponding to the path is equal to (K+1)−H or K−H.

11. The device according to claim 7, wherein the processor is caused by the machine-executable instructions further to:
when a path is deleted from the paths that are equal cost with each other,
determine the number N''' of the paths that are equal cost with each other after the path is deleted, wherein N''' is an integer more than or equal to 2;
determine, for each of the N''' paths, the number of at least one added ECMP entry corresponding to the path, and
assign the at least one ECMP entry corresponding to the deleted path to the N''' paths based on the numbers of the respective added ECMP entries corresponding to the N''' paths.

12. The device according to claim 11, wherein the processor is caused by the machine-executable instructions to:
determine, for each of the N" paths, the number H' of the at least one ECMP entry corresponding to the path based on the number N''' and the fixed value; and determine, for each of the N" paths, that the number of the at least one added ECMP entry corresponding to the path is equal to H'−(K+1) or H'−K.

13. A non-transitory machine-readable storage medium storing machine executable instructions which are invoked and executed by a processor of a network device to:

assign an inner label and an outer label for each of N paths configured to be equal cost with each other between the network device and a destination network device, wherein the respective inner labels corresponding to the paths are same with each other, and N is an integer more than or equal to 2;

establish a Forward Information DataBase (FIB) entry, wherein the FIB entry comprises an address of the destination network device, the number of Equal-Cost Multi-Path Routing (ECMP) entries in an ECMP table corresponding to the paths, and the same inner label, and the number of the ECMP entries in the ECMP table is equal to a preset fixed value; and assign at least one ECMP entry for each of the paths based on the number N of the paths and the fixed value, wherein a sum of the numbers of the respective ECMP entries corresponding to the N paths is equal to the fixed value, and the at least one ECMP entry corresponding to each of the paths comprises an index of the outer label of the path, wherein the processor is caused by the machine-executable instructions to:

determine a first numerical value K by rounding down a quotient obtained by dividing the fixed value by the number N of the paths;

determine a remainder of dividing the fixed value by the number N of the paths to be a second numerical value M;

when the second numerical value M is equal to 0, determine that the number of the at least one ECMP entry corresponding to each of the paths is equal to the first numerical value K;

when the second numerical value M is more than 0, select M paths from the N paths, determine that the number of the at least one ECMP entry corresponding to each of the selected M paths is equal to the first numerical value K plus 1, and the number of the at least one ECMP entry corresponding to each of remaining paths in the N paths is equal to the first numerical value K.

* * * * *